United States Patent
Borisch et al.

(10) Patent No.: US 9,951,674 B2
(45) Date of Patent: Apr. 24, 2018

(54) METHOD FOR PRODUCING A CORROSION RESISTANT STEEL AND CORROSION RESISTANT STEEL PROVIDED THEREBY

(71) Applicant: Hille & Müller GmbH, Düsseldorf (DE)

(72) Inventors: Annette Borisch, Velbert (DE); Philip Schmitz, Düsseldorf (DE); Ken-Dominic Flechtner, Düsseldorf (DE); Martin Schwagereit, Velbert (DE)

(73) Assignee: HILLE & MÜLLER GMBH, Düsseldorf (DE)

( * ) Notice: Subject to any disclaimer, the term of this patent is extended or adjusted under 35 U.S.C. 154(b) by 0 days.

(21) Appl. No.: 15/132,754

(22) Filed: Apr. 19, 2016

(65) Prior Publication Data

US 2017/0198624 A1 Jul. 13, 2017

(30) Foreign Application Priority Data

Jan. 7, 2016 (EP) .................................... 16150383

(51) Int. Cl.
| | |
|---|---|
| *C25D 9/10* | (2006.01) |
| *C25D 9/12* | (2006.01) |
| *F01N 13/16* | (2010.01) |
| *C21D 1/26* | (2006.01) |
| *C21D 9/52* | (2006.01) |

(Continued)

(52) U.S. Cl.
CPC .............. *F01N 13/16* (2013.01); *C21D 1/26* (2013.01); *C21D 9/52* (2013.01); *C22F 1/04* (2013.01); *C25D 3/12* (2013.01); *C25D 5/12* (2013.01); *C25D 5/36* (2013.01); *C25D 5/44* (2013.01); *C25D 5/50* (2013.01); *C25D 9/10* (2013.01); *C25D 9/12* (2013.01); *F01N 3/281* (2013.01); *F02M 37/0017* (2013.01);

(Continued)

(58) Field of Classification Search
CPC ............... C25D 9/08; C25D 9/10; C25D 9/12
USPC ............... 205/333, 320, 323, 318, 224, 229
See application file for complete search history.

(56) References Cited

U.S. PATENT DOCUMENTS

| | | | | |
|---|---|---|---|---|
| 2,512,141 A | * | 6/1950 | Ching ................... | C25D 5/50 205/224 |
| 2010/0021776 A1 | * | 1/2010 | Dougherty ............ | C25D 9/08 429/406 |
| 2010/0167087 A1 | | 7/2010 | Wijenberg et al. | |

FOREIGN PATENT DOCUMENTS

| | | |
|---|---|---|
| DE | 28 11 393 A1 | 9/1979 |
| JP | 2010-209405 A | 9/2010 |

OTHER PUBLICATIONS

European Search Report for EP Patent Application No. 16150383, four pages, search completed Jun. 29, 2016.

* cited by examiner

*Primary Examiner* — Brian W Cohen
(74) *Attorney, Agent, or Firm* — Vorys, Sater, Seymour and Pease LLP

(57) ABSTRACT

A method for producing a corrosion resistant metal substrate and corrosion resistant metal substrate provided thereby. The method involves forming a plated substrate including a metal substrate provided with a nickel layer or with a nickel and cobalt layer followed by electrodepositing a molybdenum oxide layer from an aqueous solution onto the plated substrate, which is subsequently subjected to an annealing step in a reducing atmosphere to reduce the molybdenum oxide in the molybdenum oxide layer to molybdenum metal in a reduction annealing step and to form a diffusion layer (Continued)

which contains nickel and molybdenum, and optionally cobalt.

17 Claims, 2 Drawing Sheets

(51) Int. Cl.
    *C22F 1/04*           (2006.01)
    *C25D 3/12*           (2006.01)
    *C25D 5/36*           (2006.01)
    *C25D 5/44*           (2006.01)
    *C25D 5/50*           (2006.01)
    *F02M 37/00*         (2006.01)
    *C25D 5/12*           (2006.01)
    *F01N 3/28*           (2006.01)

(52) U.S. Cl.
    CPC ...... *F01N 2510/08* (2013.01); *F01N 2530/02* (2013.01); *F01N 2530/04* (2013.01); *F01N 2530/06* (2013.01)

METHOD FOR PRODUCING A CORROSION RESISTANT STEEL AND CORROSION RESISTANT STEEL PROVIDED THEREBY

CROSS-REFERENCE TO RELATED APPLICATIONS

This claims the priority of European patent application no. EP16150383, filed 7 Jan. 2016, incorporated herein by reference.

FIELD OF THE INVENTION

This invention relates to a method for producing a corrosion resistant metal substrate and corrosion resistant metal substrate provided thereby.

BACKGROUND OF THE INVENTION

Materials used for exhaust piping, mufflers, and other exhaust system components consist mainly of ferrous alloys. Aluminium alloys are sometimes used as a coating on ferrous alloys to impart additional corrosion resistance. The choice of exhaust system materials is driven by a number of factors including cost, warranty requirements and legislated and customer demands for long service life. Mild carbon steel was the material of choice for exhaust systems for many decades. An iron oxide coating on the exhaust system protected it from atmospheric corrosion to varying degrees. However, it suffered from poor corrosion resistance when exposed to road salt and exhaust condensate. As a result, exhaust systems made from this material had a very short life if exposed to the environment experienced by many on-road vehicles. The corrosion resistance of carbon steel can be greatly improved through the use of a hot dipped aluminium coating. This is often referred to as aluminised steel.

One particularly important ferrous alloy alloying element is chromium. By adding sufficient chromium, stainless steel is formed. When stainless steel is heated, chromium forms a protective chromium oxide coating that delays further oxidation. A minimum of about 10.5% chromium is usually required to passivate the surface and to classify a material as stainless steel. So long as this oxide layer is stable and continuous, the metal substrate is well protected from corrosion. Since about the mid-1990s, plain carbon and low alloy steels have been replaced by stainless steel as the primary material for exhaust systems. This transition has taken place because of market demands for extended warranties, and because of demands mandated by emission standards. Technologies to meet increasingly stringent emission standards can raise exhaust temperatures which makes the task of meeting strength and durability requirements especially challenging. Emission standards also require that exhaust systems are designed in a manner that facilitates leak-free assembly, installation and operation for the full useful life of the vehicle.

From the early part of the 21st century, commodities including many of the alloying elements used in stainless steel, have experienced wide and rapid price fluctuations. Emission control systems such as actively regenerated diesel particulate filters (DPFs) and urea selective catalytic reduction (SCR) have also created new demands on material properties. Active DPF regeneration can produce exhaust temperatures as high as 800° C. in parts of the exhaust system that would otherwise operate at much lower temperatures. Also, some commonly used stainless steels, such as type 304, have been found to corrode after exposure to urea decomposition products in high temperature environments.

SUMMARY OF THE INVENTION

It is an object of the present invention to provide a new corrosion resistant substrate.

It is also an object of the present invention to provide a new corrosion resistant substrate for applications at high temperatures.

It is also an object of the present invention to provide a new corrosion resistant substrate for applications at high temperatures on the basis of a low cost ferrous substrate.

It is also an object of the present invention to provide a low cost method for producing a corrosion resistant substrate, suitable for applications at high temperatures.

The invention relates to a method for producing a corrosion resistant metal substrate and corrosion resistant metal substrate provided thereby. The method involves forming a plated substrate including a metal substrate provided with a nickel layer or with a nickel and cobalt layer followed by electrodepositing a molybdenum oxide layer from an aqueous solution onto the plated substrate, which is subsequently subjected to an annealing step in a reducing atmosphere to reduce the molybdenum oxide in the molybdenum oxide layer to molybdenum metal in a reduction annealing step and to form a diffusion layer which contains nickel and molybdenum, and optionally cobalt.

DETAILED DESCRIPTION OF THE PREFERRED EMBODIMENTS

Figure 1:
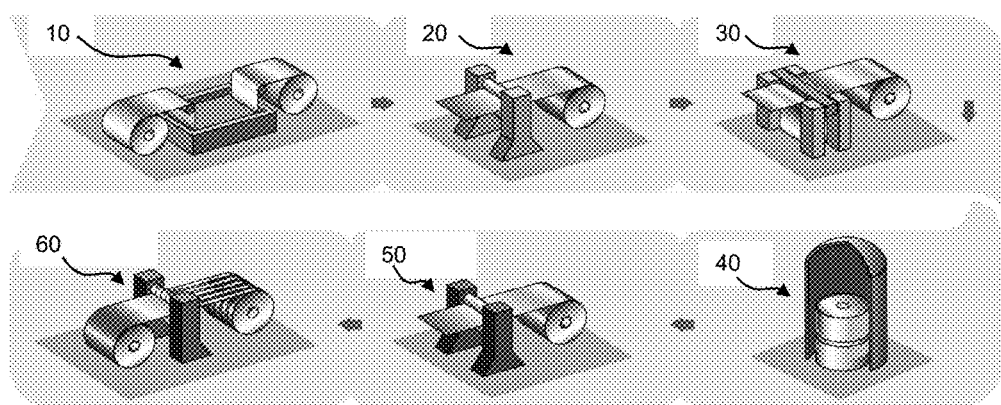
FIG. 1 shows a non-limitative example of the implementation of the process according to the invention.

One or more of the objects is reached by a method for producing a corrosion resistant metal substrate by electroplating:
  i. a nickel or nickel-based layer on a steel or aluminium substrate, or
  ii. a nickel or nickel-based layer on a steel or aluminium substrate followed by providing a cobalt layer on the nickel or nickel-based layer,
to form a plated substrate followed by electrodepositing a molybdenum oxide layer from an aqueous solution onto the plated substrate, wherein the plated substrate acts as a cathode, wherein the aqueous solution comprises a molybdenum salt and an alkali metal phosphate and wherein the pH of the aqueous solution is adjusted to between 4.0 and 6.5, wherein the plated substrate provided with the molybdenum oxide layer is subjected to an annealing step in a reducing atmosphere to, at least partly, reduce the molybdenum oxide in the molybdenum oxide layer to molybdenum metal in a reduction annealing step and to form, simultaneously or subsequently, in the annealing step a diffusion layer which contains nickel and molybdenum, and optionally cobalt, wherein the nickel originates from the nickel or nickel-based layer, the cobalt originates from the optional cobalt layer, and the molybdenum originates from the molybdenum oxide layer.

The diffusion layer contains nickel, molybdenum and optionally cobalt. There may be other components in the diffusion layer such as phosphate.

The metal substrate, which may be provided in the form of a coiled strip of steel such as (low) carbon steel or stainless steel, or in the form a coiled strip of aluminium or aluminium alloy with a suitable chemical composition for the application of the final product, is provided with a nickel layer, or a nickel-based layer, and optionally with a cobalt layer on top of the nickel or nickel-based layer to form a plated substrate. Nickel layers can for instance be deposited onto the substrate in a Watts nickel plating bath. A nickel-based layer is a layer predominantly consisting of nickel but not solely of nickel. A nickel alloy layer is therefore considered a nickel based layer. Unless indicated otherwise, the term "nickel layer" hereinafter intends to include "nickel-based layer". The corrosion protection offered by the nickel layer may be insufficient for certain applications as a result of the presence of pores in the nickel layer. The cobalt layer is used to improve the corrosion resistance of the nickel plated substrate. The plated substrate is then led through the said aqueous solution in an electroplating device in which the plated substrate acts as the cathode, and provided with the molybdenum oxide layer. The molybdenum oxide in the molybdenum oxide layer is then reduced to molybdenum metal in a reduction annealing step and, as a consequence of the high temperature during the reduction annealing step, the molybdenum diffuses into the nickel and/or cobalt layer, thereby forming a diffusion layer comprising nickel, molybdenum and optionally cobalt. So the reduction annealing step is also the diffusion annealing step. This is the preferable case. However, if necessary, the annealing step can be prolonged to further promote the diffusion after the reduction of the molybdenum oxide has been completed. Preferably the reducing atmosphere is a hydrogen containing atmosphere, such as substantially pure hydrogen or HNX.

The inventors found that the diffusion layer comprising nickel and molybdenum, and optionally cobalt, is pore free, and provides an excellent protection of the substrate. The pores in the nickel or nickel-alloy layer, if present, are closed as a result of the use of the method according to the invention.

It should be noted that after the reduction annealing step in principle all molybdenum oxide is reduced to molybdenum metal. However, after exposure of the annealed strip to the ambient atmosphere the outermost surface may reoxidise. On a 150 nm thick diffusion layer a 20 to 30 nm thick oxide layer may be present.

In an embodiment the molybdenum salt is ammonium molybdate ($(NH_4)_6Mo_7O_{24}$). The advantage of the use of ammonium as the cation is that it decomposes during the heat treatment. Other molybdenum salts would result in deposits on the surface. E.g. sodium-molybdate would result in the presence of sodium on the surface which would result in an undesirable alkaline corrosion reaction.

In an embodiment the phosphate is sodium dihydrogen phosphate ($NaH_2PO_4$). This functions acts both a conducting salt in the electrolyte and as a buffer salt. The buffer ensures that the right pH-value of the electrolyte is maintained. Potassium dihydrogen phosphate ($KH_2PO_4$) could technically also be used, alone or as a mixture with $NaH_2PO_4$, but $KH_2PO_4$ is currently more expensive and therefore economically less attractive.

In further embodiments of the invention wherein the nickel layer (or nickel-based layer) provided on the substrate is between 0.5 and 5 μm in thickness. This thickness range provides sufficient thickness for the diffusion layer after the reduction annealing to be effective. It is preferable that the diffusion layer comprising of nickel, originating from the nickel or nickel-based layer, and optionally cobalt, originating from the optional cobalt layer, and molybdenum, originating from the reduced molybdenum oxide layer, has a thickness of between 10 and 200 nm. A preferable minimum thickness is 20 nm, and a preferable maximum thickness is 150 nm. Preferably the thickness of the diffusion layer is between 50 and 100 nm.

In an embodiment
  the temperature of the aqueous solution for the electrodeposition of the molybdenum oxide layer onto the nickel plated substrate is between 40° C. and 75° C., and/or
  the plating time for the electrodeposition of the molybdenum oxide layer onto the nickel plated substrate is between 5 and 30 seconds, and/or
  the current density for the electrodeposition of the molybdenum oxide layer onto the nickel plated substrate is between 2 and 25 A/dm$^2$, and/or
  the maximum annealing temperature during the annealing step is between 500 and 1050° C., and/or
  the annealing time is between 6 and 10 hours for a batch annealing process or between 10 and 120 seconds for a continuous annealing process.

These features are independent and can be applied separately or in combination.

Preferably the temperature of the aqueous solution is at least 51° C. and/or at most 69° C. The plating time is preferably at most 20 seconds, whereas it is preferable that the current density for the electrodeposition of the molybdenum oxide layer is at least 6 and/or at most 22 A/dm$^2$. More preferably the temperature of the aqueous solution is at least 55° C. and/or at most 65° C.

In an embodiment
  the plating time for the electrodeposition of the cobalt layer onto the nickel plated substrate is between 5 and 40 seconds, and/or
  the current density for the electrodeposition of the cobalt layer onto the nickel plated substrate is between 2 and 25 A/dm$^2$, and/or The plating bath for the cobalt layer is a chloride based cobalt plating bath, see e.g. Table 10, page 354 of "Nickel, Cobalt, and their Alloys", ASM Specialty Handbook, ed. J. R. Davis., ASM International, 2000 (See FIG. 4).

In relation to the maximum annealing temperature during the annealing step a distinction can be made in dependence of the substrate. It was found that for a low-carbon steel substrate the maximum annealing temperature is 700° C., preferably 650° C. and more preferably 600° C. to prevent too large an impact on the properties of the steel substrate. For a stainless steel substrate the maximum annealing temperature is 900° C., preferably 850° C. and more preferably 800° C. to prevent too large an impact on the properties of the steel substrate. Both for low-carbon (LC) steel substrates as for stainless steel substrates the lower limit of the annealing temperature is controlled largely by the lay-out of the annealing facilities and of the economy of the process. The lower the temperature, the longer it takes for a Ni—Mo-diffusion layer of a desired thickness to form.

For an aluminium or aluminium alloy substrate, the allowable temperatures are lower. For such a substrate the maximum annealing temperature depends on the alloy is at most 500 and preferably at most 450° C. to prevent too large an impact on the properties of the substrate. A suitable temperature can be determined easily by simple trial and error. As the temperature is lower, the required diffusion time increases.

The annealing time in the batch annealing process is between 6 and 10 hours, preferably at most 8.5 hours and more preferably at most 7.5 hours. For a continuous annealing process the annealing time is at most 120 seconds, preferably at most 95 s, more preferably at most 75 s and even more preferably at most 40 s. A suitable minimum continuous annealing temperature is 5 s, preferably at least 10 s. There is a degree of interchangeability between the annealing time and the annealing temperature. It should be noted that when referring to an annealing time of 8.5 hours in a batch annealing furnace this intends to mean that the cold spot of the (coiled) material reaches the set temperature in 8.5 hours, after which the cooling starts. A total cycle of heating and cooling may therefore be considerably longer than 8.5 hours and be more than double that value.

In an embodiment the aqueous solution for the electrodeposition of the molybdenum oxide layer onto the plated substrate comprises:
between 10 and 50 g/l of $(NH_4)_6Mo_7O_{24}$, and/or
between 20 and 80 g/l of $NaH_2PO_4$.

This composition allows to effectively and reproducibly deposit the molybdenum oxide layer. It is noted that 30 g/l of $(NH_4)_6Mo_7O_{24}$ corresponds to 0.024 mol/l and 50 g/l of $NaH_2PO_4$ to 0.42 mol/l.

In a preferable embodiment the thickness of the deposited molybdenum oxide layer is at most 100 nm, preferably at most 75, more preferably 50 nm, and even more preferably 40 nm. Preferably the minimum thickness is at least 10 nm.

In an embodiment the pH of the aqueous solution is at least 4.5 and/or at most 6. Preferably the pH is at least 5.25 and/or at most 5.75.

In a preferable embodiment wherein the cathodic current density for depositing the molybdenum oxide layer is at least 12.5 $A/dm^2$ and preferably at least 15 $A/dm^2$.

Preferably the steel substrate is a carbon steel, preferably a low carbon steel, extra-low carbon steel or a HSLA-steel. These unalloyed (LC and ELC) or micro-alloyed (HSLA) steels are relatively cheap substrates and provide good strength and formability. The steels are produced by means of commonly known processes such as casting, hot-rolling and cold-rolling. Low carbon steels typically comprise 0.05 to 0.15 wt. % C and extra low carbon steels typically comprise 0.02 to 0.05 wt. % C. Other elements may be present in addition to carbon in accordance with EN 10020-2000 which prescribes how much of a certain element may be present to still be considered an unalloyed steel. High-strength low-alloy (HSLA) steels (aka micro-alloyed steels) are designed to provide better mechanical properties and/or greater resistance to atmospheric corrosion than carbon steels. The HSLA steels have low carbon contents (0.05-0.15% C) in order to produce adequate formability and weldability, and they have manganese contents up to 2.0%. Small quantities of chromium, nickel, molybdenum, copper, nitrogen, vanadium, niobium, titanium and zirconium are used in various combinations to achieve the desired properties. It is preferable that the steel substrate has been cold-rolled to its final thickness, usually between 0.15 and 1.5 mm, and the cold-rolled steel substrate may or may not have been recrystallisation or recovery annealed prior to depositing the nickel and optional cobalt layer according to the invention. The steel substrate is preferably supplied in the form of a coiled strip.

In an embodiment of the invention the steel substrate is a ferritic stainless steel, such as an SAE 400-series, which generally are considered to have better engineering properties than austenitic stainless steel grades, but have reduced corrosion resistance, because of the lower chromium and nickel content. They are also usually less expensive. Ferritic stainless steels have a body-centered cubic crystal structure and contain between 10.5% and 27% chromium with very little nickel, if any. By means of a non-limiting example the steel SAE 430 (1.4016) proved to be a useful substrate for the method according to the invention. It is preferable that the stainless steel substrate has been cold-rolled to its final thickness, usually between 0.15 and 1.5 mm, and the cold-rolled steel substrate may or may not have been recrystallisation or recovery annealed prior to depositing the nickel and optional cobalt layer according to the invention. The stainless steel substrate is preferably supplied in the form of a coiled strip.

The substrate for the method according to the invention may also be an aluminium or an aluminium alloy substrate.

In an embodiment the diffusion layer comprising of nickel originating from the nickel or nickel-based layer and molybdenum originating from the molybdenum oxide layer also comprises phosphor, preferably 5 to 15 wt. % of phosphor, more preferably 6 to 13 wt. %. A suitable maximum amount is 10 wt. %. A suitable minimum amount is 7 wt. %. Although the oxidation state of the phosphor is not exactly known, it is believed that the phosphor originated from the phosphate in the electrolyte. It may even still be present as phosphate in the layer. It is believed that its presence contributes to the corrosion protection of the layer.

According to a second aspect, the invention is also embodied in a corrosion resistant metal substrate provided with a diffusion layer comprising nickel, molybdenum and optionally cobalt, produced according to the invention wherein the diffusion layer (i.e. the Ni—Mo— or Ni—Mo—Co-diffusion layer) has a thickness of between 10 and 200 nm. A preferable minimum thickness is 20 nm, and a preferable maximum thickness is 150 nm. Preferably the thickness of the Ni—Mo-diffusion layer is between 50 and 100 nm. This thickness can be determined e.g. by means of GDOES. The thickness of the layer is determined by locating the halfvalue (ignoring the surface effects) of the Mo-curve. The thickness in FIG. 2 (before annealing) results in a NiMo-layer thickness of 60 nm and in FIG. 3 in a Mo-alloy layer of 80 nm. It is noted that FIG. 3 shows that the tail of the Mo-signal in FIG. 3 is much more pronounced than in FIG. 2 as a result of the diffusion of the Mo into the nickel layer.

According to a third aspect, the invention is embodied in an exhaust system or parts for an exhaust system produced from the metal substrate according to the invention. In another embodiment of the invention the metal substrate according to the invention is used in fuel lines for instance for internal combustion engines.

The invention will now be further explained by means of the following, non-limitative examples.

An aqueous solution was prepared consisting of 30 g/l of $(NH_4)_6Mo_7O_{24}$ (0.024 mol/l) and 50 g/l of $NaH_2PO_4$ (0.42 mol/l) with a pH of 5.5 and maintained at 60° C. A molybdenum-oxide layer was deposited on a 2 μm matt nickel plated low-carbon steel using a current density of 20 $A/dm^2$ and a plating time of 15 and 10 seconds. This material was then annealed in a reducing hydrogen atmosphere for 7.3 hours in a batch annealing furnace. The resulting Ni—Mo-diffusion layer has a thickness of about 150 nm at the surface of the coated substrate. These materials were subsequently tested in a salt spray test (NSS) according to ISO 9227:2012 at 5% NaCl and 35° C. and the corrosion protection for the 10 seconds plating time layer was up to 21 hrs (Ni-layer, both sides 2 μm). Also the number of pores in the Ni—Mo-diffusion layer was much reduced. The pores were determined visually on a sample which was subjected to an aqueous solution as described in the ferroxyl test in ASTM A380. The rating of samples is a qualitative rating, but quite indicative for its performance under corrosive conditions, such as in exhaust applications.

Experiments using the conditions above result in the following linear dependence of the amount of Mo deposited on plating time (measured after annealing using Atomic Absorption Spectroscopy after dissolution of the layer of the substrate in HCl (1:1)).

| Plating time | A/dm² | mg (Mo)/m² |
|---|---|---|
| 5 | 20 | 94 |
| 10 | 20 | 128 |
| 15 | 20 | 174 |
| 20 | 20 | 220 |

FIG. 1 shows a non-limitative example of the implementation of the process according to the invention. The hot-rolled starting product is pickled (in pickling device 10) to remove the oxides from the strip and clean the surface. After pickling the strip is cold-rolled (in cold rolling device 20). In the plating step (in plating device 30) the various layers are electrodeposited. In the annealing step (in annealing device 30) the diffusion annealing takes place. FIG. 1 also shows temper rolling (in temper rolling device 50) and Slitting/Packaging (in Slitting/Packaging device 60). The cold-rolling can obviously also take place elsewhere when the cold-rolled coil is bought from a supplier of cold rolled coil.

Figure 2:
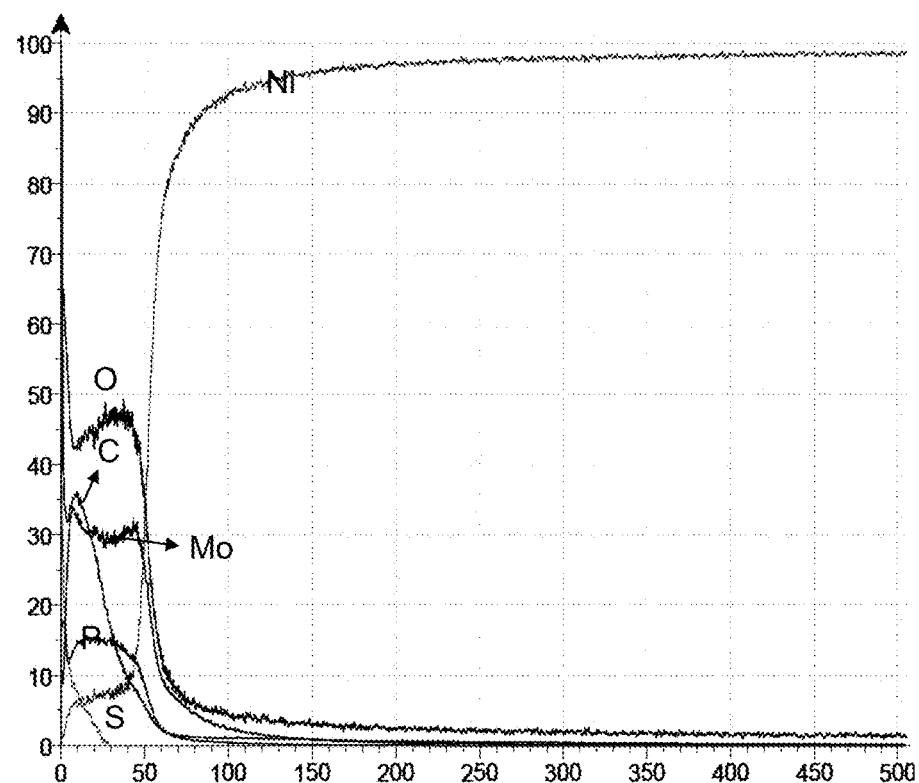
FIG. 2 shows a GDOES (Glow Discharge Optical Emission Spectroscopy)-measurement of the surface after depositing the molybdenum oxide on the nickel layer.
Figures 3, 4:
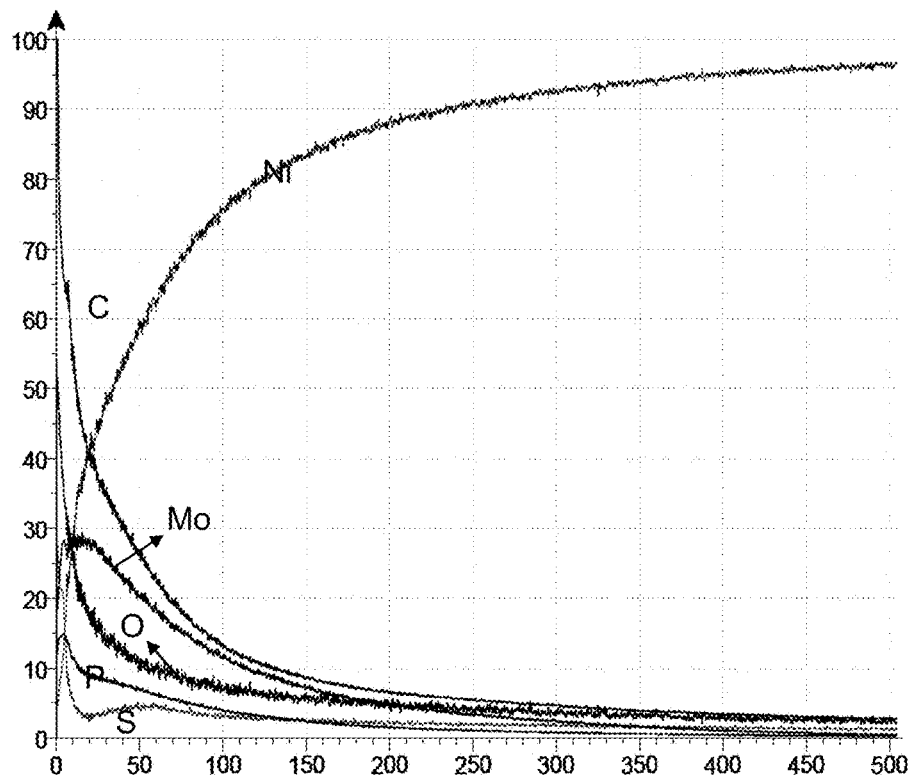
FIG. 3 shows a GDOES-measurement of the surface after annealing the layers of FIG. 2.
FIG. 4 is Table 10, from page 354 of "Nickel, Cobalt, and their Alloys", ASM Specialty Handbook, ed. J. R. Davis., ASM International, 2000.

FIG. 2 shows a GDOES-measurement of the surface after depositing the molybdenum oxide on the nickel layer. The X-axis gives the thickness in nm and the Y-axis gives the concentration in wt %. Note that the values for carbon and sulphur are in fact 10 times as low as presented. Clearly visible is the layer of molybdenum oxide on top of the nickel layer. The nickel layer is 2 μm (i.e. 2000 nm), whereas the molybdenum oxide layer is about 60 nm.

FIG. 3 shows a GDOES-measurement of the surface after annealing the layers of FIG. 2. Note that the values for carbon and sulphur are in fact 10 times as low as presented. The clearly discernible layer of molybdenum oxide on top of the nickel layer has vanished, and a diffusion layer comprising nickel and molybdenum is shown. There is still a degree of oxygen present in the surface layers, but this is believed to be associated with re-oxidation if the surface, and with the presence of the phosphates, and not with the molybdenum oxide which has reduced to metallic molybdenum.

The invention claimed is:

1. A method for producing a corrosion resistant metal substrate by providing:
   i. a nickel or nickel-based layer on a steel or aluminium substrate, or
   ii. a nickel or nickel-based layer on a steel or aluminium substrate followed by providing a cobalt layer on the nickel or nickel-based layer, to form a plated substrate followed by electrodepositing a molybdenum oxide layer from an aqueous solution onto the plated substrate, wherein the plated substrate acts as a cathode, wherein the aqueous solution comprises a molybdenum salt and an alkali metal phosphate and wherein the pH of the aqueous solution is adjusted to between 4.0 and 6.5, wherein the plated substrate provided with the molybdenum oxide layer is subjected to an annealing step in a reducing atmosphere to, at least partly, reduce the molybdenum oxide in the molybdenum oxide layer to molybdenum metal in a reduction annealing step and to form, simultaneously or subsequently, in the annealing step a diffusion layer which contains nickel and molybdenum, and optionally cobalt, wherein the nickel originates from the nickel or nickel-based layer, the cobalt originates from the optional cobalt layer, the molybdenum originates from the molybdenum oxide layer, and wherein the diffusion layer comprising of nickel originating from the nickel or nickel-based layer and molybdenum originating from the molybdenum oxide layer also comprises 5 to 15 wt. % of elemental phosphorus.

2. The method according to claim 1, wherein the molybdenum salt is ammonium molybdate.

3. The method according to claim 1, wherein the phosphate is sodium dihydrogen phosphate.

4. The method according to claim 1, wherein the nickel or nickel-based layer provided on the steel or aluminium substrate is between 0.5 and 5 μm in thickness, and/or wherein the diffusion layer has a thickness of between 10 and 200 nm.

5. The method according to claim 1, wherein:
   the temperature of the aqueous solution for the electrodeposition of the molybdenum oxide layer onto the nickel plated steel or aluminium substrate is between 40° C. and 75° C., and/or
   the plating time for the electrodeposition of the molybdenum oxide layer onto the nickel plated steel or aluminium substrate is between 5 and 30 seconds, and/or
   the current density for the electrodeposition of the molybdenum oxide layer onto the nickel plated steel or aluminium substrate is between 2 and 25 A/dm2, and/or
   the maximum annealing temperature during the annealing step is between 500 and 1050° C., and/or
   the annealing time is between 6 and 10 hours for a batch annealing process and between 10 and 120 seconds for a continuous annealing process.

6. The method according to claim 1, wherein the aqueous solution for the electrodeposition of the molybdenum oxide layer onto the nickel plated steel or aluminium substrate comprises:
   between 10 and 50 g/l of (NH4)6Mo7O24, and/or
   between 20 and 80 g/l of NaH2PO4.

7. The method according to claim 1,
   wherein the aqueous solution is maintained at a temperature between 50 and 70° C. and/or
   wherein the pH of the aqueous solution is at least 4.5 and/or at most 6.

8. The method according to claim 1, wherein the thickness of the deposited molybdenum oxide layer is at most 50 nm.

9. The method according to claim 1, wherein the cathodic current density is at least 12.5 A/dm2 and/or at most 22.5 A/dm2.

10. The method according to claim 1, wherein the reducing atmosphere is a hydrogen containing atmosphere.

11. The method according to claim 1, wherein from the steel or aluminium substrate is selected the steel substrate.

12. The method according to claim 11, wherein the steel substrate is a ferritic stainless steel substrate.

13. The method according to claim 1, wherein the plated substrate provided with the molybdenum oxide layer is subjected to the annealing step in the reducing atmosphere to fully, reduce the molybdenum oxide in the molybdenum oxide layer to molybdenum metal in a reduction annealing step.

14. The method according to claim 11, wherein the steel substrate is a carbon steel substrate.

15. The method according to claim 11, wherein the steel substrate is a low carbon steel substrate.

16. The method according to claim 1, wherein the nickel or nickel-based layer provided on the steel or aluminium substrate is between 0.5 and 5 μm in thickness.

17. The method according to claim 1, wherein the diffusion layer has a thickness of between 10 and 200 nm.

\* \* \* \* \*